Patented Dec. 27, 1932

1,892,101

UNITED STATES PATENT OFFICE

HERMAN A. BRUSON, OF GERMANTOWN, PENNSYLVANIA, ASSIGNOR TO THE RESINOUS PRODUCTS & CHEMICAL COMPANY, OF PHILADELPHIA, PENNSYLVANIA

PROCESS FOR TREATING POLYMERIZABLE UNSATURATED COMPOUNDS

No Drawing. Application filed April 24, 1931. Serial No. 532,701.

This invention relates to a process for treating polymerizable unsaturated organic compounds with aryl diazonium fluoborates to form compounds which are either polymers or higher molecular weight condensation products of the original unsaturated substance.

It is already known that certain catalysts such as sulphuric acid, sulphonic acids, metallic halides, organic peroxides, boron fluoride, fluoboroacetic acid, sodium, sodium-mercury amalgams and special types of infusorial earths ("Florida earth") are effective catalysts for polymerizing unsaturated hydrocarbons and other polymerizable unsaturated organic compounds.

Boron trifluoride which has been known to polymerize unsaturated compounds is a gas which readily decomposes with moisture and which is difficult to handle because of its corrosive nature and poisonous properties. The metallic halides such as aluminum chloride, stannic chloride, titanium tetrachloride, antimony chlorides, ferric chloride and the like are very susceptible to moisture which destroys their catalytic action. Furthermore it is very difficult to remove residual traces of these salts from the polymers which they produce. This decreases the insulating value of the polymers obtained and leads to a more rapid deterioration of the polymers upon ageing. The same difficulties are encountered with the use of sulphuric acid, sulfonic acids, acid chlorides, fluoboroacetic acids, sodium-amalgam, and the like.

The present invention utilizes as new catalysts for such reactions, the aryl diazonium fluoborates as a general class, and more specifically phenyl-diazonium fluoborate, $C_6H_5$—$N_2$—$BF_4$.

The use of the aryl diazonium fluoborates in place of the above mentioned catalysts and others which have heretofore been employed, possesses several distinct advantages. The aryl diazonium fluoborates are crystalline non-explosive organic compounds, which are stable against moisture and which are automatically completely removed from the polymers and condensation products which they produce under the polymerizing conditions. They are very easy to handle and yield purer polymers than can be obtained by the use of any of the catalysts heretofore employed.

The aryl diazonium fluoborates effect a smooth, rapid polymerization of unsaturated organic compounds and are automatically broken down into volatile or non-objectionable neutral aryl fluorides which have no deteriorating effect upon the polymers obtained. Fluorbenzene which is for example formed when phenyl-diazonium fluoborate is used as a polymerizing agent is a very volatile liquid which under the conditions of polymerization vaporizes away leaving the polymer in a pure state free from salts or acids of any kind. This is an important property to bear in mind where one wishes to prepare polymerized synthetic resins for use in cable insulation and for other insulating purposes where deterioration must be kept at a minimum.

Furthermore since a large volume of nitrogen and other gases are evolved during the polymerization with phenyl diazonium fluoborate it is possible to obtain under certain conditions, polymerized masses, having a high degree of porosity and resembling cork in their physical properties. Such materials can not be obtained by known processes of polymerization and since they possess considerable practical value as cork substitutes their manufacture is also described herein.

Example 1

(a) To 100 grams of indene dissolved in an equal volume of solvent naphtha, 10 grams of phenyl diazonium fluoborate was added. The mixture was then warmed to about 90° C. A vigorous reaction took place. The brown solution obtained was then steam distilled to remove excess solvent and unchanged indene together with a small quantity of phenyl fluoride. A pure white powder having a melting point of 260° C. was obtained. The latter represents a very pure form of the well known para-indene.

(b) In a similar manner styrene yielded a white, powdery polymer soluble in toluol.

(c) Similarly, cyclopentadiene yielded para-cyclopentadiene previously discovered by the present inventor and another and described by them in U. S. Patent 1,720,929 (1929).

(d) Coumarone reacts in analogous manner yielding para-coumarone in the form of a white benzene-soluble powder.

(e) Phenyl-butadiene, $C_6H_5-CH=CH-CH=CH_2$ when treated as in (a) yields a polymer which is a white amorphous powder.

(f) The commercial crude indene-coumarone fraction of coal tar distillate boiling between 165 and 180° C was warmed with 10% of its weight of phenyl diazonium fluoborate at 90–100° C. until reaction ceased. The polymerization product may be obtained by steam distilling off excess solvent or by precipitating the resin with alcohol. It forms a white amorphous mass.

*Example 2*

100 grams of rectified turpentine (essentially pinene boiling at 155–160° C.) was mixed with 20 grams of phenyl diazonium fluoborate and heated on the steam bath at 100° C. until the vigorous reaction which set in had ceased. The product was then distilled in vacuo. The first fraction which distilled over consisted of phenyl fluoride and some unchanged turpentine. The main fraction boiled at 180° C. at 15 m.m. pressure and formed a colorless, heavy oil. The still residue consisted of 25 grams of a clear transparent resin resembling colophony.

*Example 3*

Isoprene was heated under reflux with an equal volume of toluene and 15 percent by weight of phenyl diazonium fluoborate for about one half hour. Upon pouring the solution into a large volume of alcohol, a white powdery polymer of isoprene was obtained.

*Example 4*

A highly unsaturated sample of cracked gasolene having a boiling range of 90–200° C. and consisting of about 45% olefines was heated with 20 per cent by weight of phenyl tetrazonium-di-fluoborate,

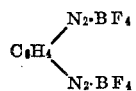

such as is obtained by diazotizing each amino group of para-phenylene diamine and coupling the diazonium salt with fluoboric acid. Upon redistilling the reaction product about 20% of material boiling above 200° C. was obtained as a colorless oil together with a considerable quantity of solid resin. The latter is useful in coating compositions.

*Example 5*

Twenty grams of phenyl diazonium fluoborate was dispersed in 100 grams of Hevea rubber by milling upon steel rolls. The mixture was rolled into a compact ball, placed in an oven and heated to 130–140° C. for about 2 hours. A hard product resembling gutta percha was obtained. It may be worked upon a rubber mill and forms a dense tough sheet resembling leather. The latter may be used for electrical insulating purposes in sheet or plate form. It may also be dissolved in gasoline or benzene and used as a coating composition alone or in conjunction with softening agents, sulfur, accelerators, pigments and the like.

If the mixture of rubber and phenyl diazonium fluoborate is heated in a closed cavity under pressure as for example in a hydraulic press between cavity plates and the pressure suddenly released a voluminous material resembling froth but substantially hard and tough in nature is obtained. It is very light in weight and may be cut into various shapes for use as an insulating medium in refrigerators and for other purposes where thermal insulation is required.

*Example 6*

Hevea rubber is heated at 140° C. with 10 percent by weight of phenol-diazonium fluoborate which has previously been milled into the rubber. A hard ebonite-like material is obtained after 4 hours heating.

*Example 7*

Indene is warmed with 10 percent by weight of chlorophenyl-diazonium fluoborate at 80–90° C. The mass becomes viscous and almost solid. By adding alcohol, para-indene is precipitated as a white amorphous powder.

In the above examples I have preferentially used phenyl diazonium fluoborate but I do not wish to be limited thereto since the diazonium fluoborate derivatives of toluene, naphthalene, diphenyl, bromobenzene of phenols and of other aromatic compounds may be used for the same purpose. Furthermore the poly-diazonium fluoborates i. e. aryl diazonium fluoborates having two or more $—N_2—BF_4$ groups in the molecule may be used as set forth in Example 4 for polymerizing the unsaturated compounds set forth herein.

It is herein understood that the proportions of diazonium compound may be varied considerably from the proportions given. In general 10–30% by weight will be found sufficient. Furthermore the temperatures may be varied, and inert solvents other than those specified may be used such as chloroform, ethylene dichloride, etc., without departing from the scope of this invention. Other polymerizable compounds such as linseed oil and tung oil as well as the general class of diolefines represented by butadiene and its homologues; furthermore dihydrobenzene and many other polymerizable compounds may be similarly converted into higher condensation products by the process described above. Any or all of these reactions may be carried out if desired, at elevated pressures in closed containers.

What I claim is:

1. A process of treating polymerizable unsaturated organic compounds which comprises heating them to reaction temperature with an aryl diazonium fluoborate.

2. A process as described in claim 1 carried out in the presence of an inert solvent.

3. A process as described in claim 1 carried out in a closed system under pressure.

4. A process as described in claim 1 carried out in a closed system under pressure in the presence of an inert solvent.

5. A process for treating polymerizable unsaturated organic compounds which comprises heating them to reaction temperature with phenyl-diazonium fluoborate.

6. A process for treating rubber which comprises heating it with an aryl diazonium fluoborate.

7. A process for treating rubber which comprises heating it with phenyl-diazonium fluoborate.

8. A process for treating rubber which comprises heating it with an aryl diazonium fluoborate under pressure.

9. A process for treating rubber which comprises heating it with an aryl diazonium fluoborate under pressure, and suddenly releasing the pressure to form a foam-like product.

10. A process for treating rubber which comprises dispersing an aryl diazonium fluoborate in rubber by milling, then heating this product.

11. A new composition of matter consisting of a foam-like conversion product of natural rubber prepared by heating rubber with an aryl diazonium fluoborate under pressure.

12. A process for treating polymerizable hydrocarbons which comprises heating them at reaction temperature with an aryl diazonium fluoborate.

13. A process for treating polymerizable hydrocarbons which comprises heating them at reaction temperature with phenyl diazonium fluoborate.

14. A process as described in claim 12 in which the aryl diazonium fluoborate constitutes from 10 to 30% by weight of the starting material, the unreacted materials being removed after the reaction is over.

15. A process for treating polymerizable unsaturated organic compounds which comprises heating them at a reaction temperature with a fluoborate of a poly-diazotized aromatic poly-amine.

16. A process of treating indene which comprises heating it to reaction temperature with an aryl diazonium fluoborate.

17. A process of treating indene which comprises heating it to reaction temperature with phenyl diazonium fluoborate.

18. A process of treating pinene which comprises heating it to reaction temperature with an aryl diazonium fluoborate.

19. A process of treating pinene which comprises heating it to reaction temperature with phenyl diazonium fluoborate.

In testimony whereof, I affix my signature.

HERMAN A. BRUSON.